(12) United States Patent
Tanaka et al.

(10) Patent No.: US 8,067,104 B2
(45) Date of Patent: Nov. 29, 2011

(54) MANUFACTURING METHOD OF MAGNETIC RECORDING MEDIUM, THE MAGNETIC RECORDING MEDIUM, AND MAGNETIC RECORDING AND REPRODUCING APPARATUS

(75) Inventors: Tsutomu Tanaka, Kawasaki (JP); Kenji Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 114 days.

(21) Appl. No.: 12/272,461

(22) Filed: Nov. 17, 2008

(65) Prior Publication Data

US 2009/0273861 A1 Nov. 5, 2009

(30) Foreign Application Priority Data

Apr. 30, 2008 (JP) ................. 2008-118926

(51) Int. Cl.
*G11B 5/66* (2006.01)
(52) U.S. Cl. ........ 428/832; 427/526; 427/528; 427/531; 427/130; 427/131

(58) Field of Classification Search .................. None
See application file for complete search history.

(56) References Cited

U.S. PATENT DOCUMENTS

| | | | |
|---|---|---|---|
| 6,331,364 B1 * | 12/2001 | Baglin et al. ................. 428/830 |
| 6,383,597 B1 * | 5/2002 | Fullerton et al. ........... 428/836.1 |
| 2004/0180173 A1 * | 9/2004 | Do et al. ....................... 428/65.3 |
| 2009/0117409 A1 * | 5/2009 | Lee et al. ................... 428/836.1 |
| 2009/0155628 A1 * | 6/2009 | Lee et al. ....................... 428/828 |

FOREIGN PATENT DOCUMENTS

JP B2 6-28093 1/1991

* cited by examiner

*Primary Examiner* — Holly Rickman
(74) *Attorney, Agent, or Firm* — Fujitsu Patent Center (57) ABSTRACT

A magnetic recording medium includes a substrate; and a recording film formed on the substrate and including a main magnetic film, the main magnetic film where a recording area and a guard area are formed by local ion doping, the guard area having saturation magnetization smaller than saturation magnetization of the recording area. A primary layer is provided at a substrate side of the main magnetic film. A main ingredient of the primary layer is at least one kind of atom selected from a group consisting of Cr, B, Mo, Al, Si, and C.

13 Claims, 9 Drawing Sheets

| | MATERIAL OF PRIMARY LAYER | COERCIVE FORCE (Oe) | SATURATION MAGNETIZATION (emu/cm²) | JUDGMENT |
|---|---|---|---|---|
| COMPARISON EXAMPLE 1-1 | BEFORE ION DOPE | 520 | 910 | — |
| COMPARISON EXAMPLE 1-2 | NO PRIMARY LAYER (CONVENTIONAL ART) | 510 | 910 | — |
| EXAMPLE 1-1 | Cr | 10 | 240 | ○ |
| EXAMPLE 1-2 | B | 10 | 260 | ○ |
| EXAMPLE 1-3 | Mo | 30 | 220 | ○ |
| EXAMPLE 1-4 | Mg | 100 | 450 | × |
| EXAMPLE 1-5 | Cu | 50 | 350 | △ |
| EXAMPLE 1-6 | Al | 10 | 220 | ○ |
| EXAMPLE 1-7 | C | 10 | 210 | ○ |
| EXAMPLE 1-8 | Ti | 150 | 450 | × |
| EXAMPLE 1-9 | Si | 20 | 260 | ○ |

FIG.5

| | MATERIAL OF PRIMARY LAYER | COERCIVE FORCE (Oe) | SATURATION MAGNETIZATION (emu/cm²) | JUDGMENT |
|---|---|---|---|---|
| COMPARISON EXAMPLE 2-1 | BEFORE ION DOPE | 470 | 820 | — |
| COMPARISON EXAMPLE 2-2 | NO PRIMARY LAYER (CONVENTIONAL ART) | 450 | 810 | — |
| EXAMPLE 2-1 | Cr | 10 | 200 | ○ |
| EXAMPLE 2-2 | B | 10 | 210 | ○ |
| EXAMPLE 2-3 | Mo | 20 | 190 | ○ |
| EXAMPLE 2-4 | Mg | 90 | 420 | × |
| EXAMPLE 2-5 | Cu | 40 | 310 | △ |
| EXAMPLE 2-6 | Al | 10 | 190 | ○ |
| EXAMPLE 2-7 | C | 10 | 180 | ○ |
| EXAMPLE 2-8 | Ti | 140 | 420 | × |
| EXAMPLE 2-9 | Si | 10 | 230 | ○ |

FIG.6

| | MATERIAL OF PRIMARY LAYER | COERCIVE FORCE (Oe) | SATURATION MAGNETIZATION (emu/cm²) | JUDGMENT |
|---|---|---|---|---|
| COMPARISON EXAMPLE 3-1 | BEFORE ION DOPE | 850 | 380 | — |
| COMPARISON EXAMPLE 3-2 | NO PRIMARY LAYER (CONVENTIONAL ART) | 670 | 380 | — |
| EXAMPLE 3-1 | Cr | 10 | 80 | ○ |
| EXAMPLE 3-2 | B | 20 | 50 | ○ |
| EXAMPLE 3-3 | Mo | 20 | 100 | ○ |
| EXAMPLE 3-4 | Mg | 100 | 310 | × |
| EXAMPLE 3-5 | Cu | 80 | 250 | × |
| EXAMPLE 3-6 | Al | 30 | 90 | ○ |
| EXAMPLE 3-7 | C | 10 | 90 | ○ |
| EXAMPLE 3-8 | Ti | 30 | 280 | × |
| EXAMPLE 3-9 | Si | 10 | 60 | ○ |

FIG.7

| | MATERIAL OF PRIMARY LAYER | COERCIVE FORCE (Oe) | SATURATION MAGNETIZATION (emu / cm$^2$) | JUDGMENT |
|---|---|---|---|---|
| COMPARISON EXAMPLE 4-1 | BEFORE ION DOPE | 510 | 430 | — |
| COMPARISON EXAMPLE 4-2 | NO PRIMARY LAYER (CONVENTIONAL ART) | 480 | 430 | — |
| EXAMPLE 4-1 | Cr | 10 | 100 | ○ |
| EXAMPLE 4-2 | B | 20 | 50 | ○ |
| EXAMPLE 4-3 | Mo | 30 | 120 | ○ |
| EXAMPLE 4-4 | Mg | 100 | 310 | × |
| EXAMPLE 4-5 | Cu | 90 | 270 | × |
| EXAMPLE 4-6 | Al | 40 | 110 | ○ |
| EXAMPLE 4-7 | C | 20 | 130 | ○ |
| EXAMPLE 4-8 | Ti | 60 | 300 | × |
| EXAMPLE 4-9 | Si | 20 | 90 | ○ |

MANUFACTURING METHOD OF MAGNETIC RECORDING MEDIUM, THE MAGNETIC RECORDING MEDIUM, AND MAGNETIC RECORDING AND REPRODUCING APPARATUS

BACKGROUND

1. Field of the Invention

The present invention generally relates to manufacturing methods of magnetic recording media, the magnetic recording media, and magnetic recording and reproducing apparatuses. More specifically, the present invention relates to a manufacturing method of a magnetic recording medium whereby a magnetic pattern is formed by ion doping, the magnetic recording medium, and a magnetic recording and reproducing apparatus.

2. Description of the Related Art

Hard disk drives (HDD) are mainly used as mass storage devices whereby high speed access or high speed transmitting of data can be realized. The surface recording density of the hard disk drives (HDD) is being improved at an annual rate of 100% and further improvement of recording densities is expected.

In order to improve the recording densities of the HDDs, reduction of the track width or the recording bit length is necessary. However, if the track width is reduced, neighboring tracks may easily interfere with each other. Due to such a reduction of the track width, the magnetic recording information may be easily overwritten in the neighboring tracks at the time of recording. Cross-talk due to leakage magnetic fields from the neighboring tracks may easily occur at the time of reproducing.

The above-mentioned issues cause reduction of the S/N ratio of a reproduction signal so that the error rate may be degraded. In addition, if reducing the recording bit length is continued, stability of the bit becomes degraded and the phenomenon of heat fluctuation is generated.

For solving such an issue, a bit patterned type magnetic recording medium has been suggested to reduce influence between neighboring tracks and realize high track densities. See Japanese Examined Patent Application Publication No. 6-28093.

However, in a forming method of the magnetic recording medium by the bit patterned type medium, a portion other than the bit pattern is etched so that the magnetic film is removed and then a non-magnetic material is supplied and flattened to fill in that portion. Hence, it is necessary to perform complex manufacturing processes so that the manufacturing cost may increase.

As a method for solving such an issue, a processing method whereby ions are implanted into a magnetic film so that a magnetic state is partially changed has been suggested. In this method, since the magnetic state is changed by doping with the ions, a complex manufacturing process such as etching, filling or flattening is not required so that increase of the manufacturing cost is prevented.

However, in a related art method for doping with ions, erasure of magnetism in an ion doped area (hereinafter a guard area) cannot be performed sufficiently. Furthermore, in a case where an amorphous magnetic film such as a rare earth transition metal is used as a magnetic film in order to solve this issue, saturation magnetization of a base part (which becomes the recording area) for maintaining the magnetic state is low and therefore it is not proper for high recording densities so that this is not yet utilized.

SUMMARY

Accordingly, embodiments of the present invention may provide a novel and useful manufacturing method of a magnetic recording medium, the magnetic recording medium, and a magnetic recording and reproducing apparatus, solving one or more of the issues discussed above.

More specifically, the embodiments of the present invention may provide a manufacturing method of a magnetic recording medium, the magnetic recording medium whereby magnetic recording can be performed well in a recording area by providing a primary layer for reducing saturation magnetization of a guard area, and a magnetic recording and reproducing apparatus.

One aspect of the embodiments of the present invention may be to provide a magnetic recording medium, including a substrate; and a recording film formed on the substrate and including a main magnetic film, the main magnetic film where a recording area and a guard area are formed by local ion doping, the guard area having saturation magnetization smaller than saturation magnetization of the recording area; wherein a primary layer is provided at a substrate side of the main magnetic film; and a main ingredient of the primary layer is at least one kind of atom selected from a group consisting of Cr, B, Mo, Al, Si, and C.

Another aspect of the embodiments of the present invention may be to provide a manufacturing method of a magnetic recording medium, including the steps of: forming a primary layer whose main ingredient is at least one kind of atom selected from a group consisting of Cr, B, Mo, Al, Si, and C; forming a main magnetic film on the primary layer after the primary layer is formed; and forming a recording area and a guard area having saturation magnetization less than saturation magnetization of the recording area by local ion doping on the main magnetic film.

Another aspect of the embodiments of the present invention may be to provide a magnetic recording and reproducing apparatus, including: a magnetic recording medium; a magnetic head configured to perform a magnetic recording and reproducing process on the magnetic recording medium; an arm configured to support the magnetic head; and a moving part configured to move the arm, wherein the magnetic recording medium includes: a substrate; and a recording film formed on the substrate and including a main magnetic film, the main magnetic film where a recording area and a guard area are formed by local ion doping, the guard area having saturation magnetization less than saturation magnetization of the recording area; wherein a primary layer is provided at a substrate side of the main magnetic film; and a main ingredient of the primary layer is at least one kind of atom selected from a group consisting of Cr, B, Mo, Al, Si, and C.

Additional objects and advantages of the invention (embodiment) will be set forth in part in the description which follows, and in part will become obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF EXAMPLE OF EMBODIMENTS

A description is given below, with reference to FIG. 1 through FIG. 9 of embodiments of the present invention.

Figure 1:
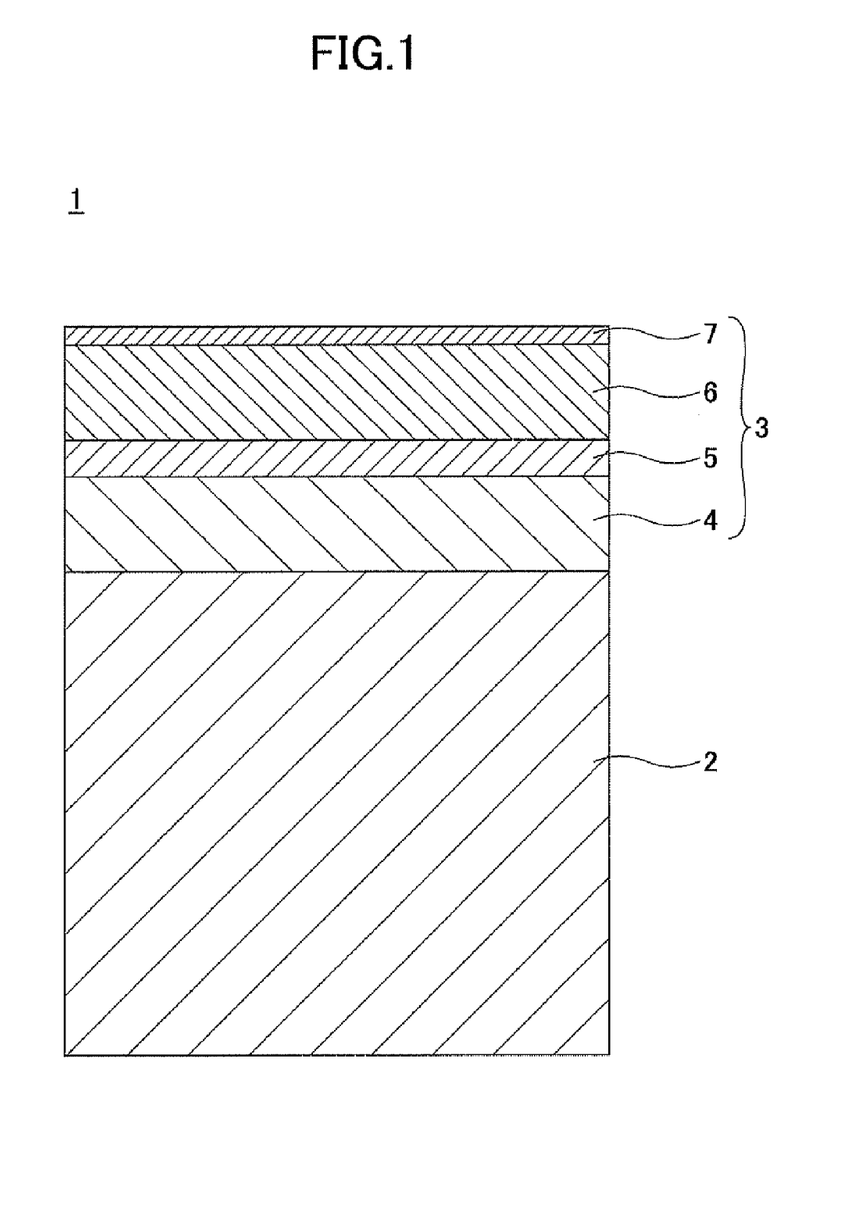
FIG. 1 is a cross-sectional view of a magnetic recording medium of an embodiment of the present invention.

FIG. 1 is a cross-sectional view of a magnetic recording medium 1 of an embodiment of the present invention. The magnetic recording medium 1 is a vertical magnetic recording medium. The magnetic recording medium 1 has a structure where a recording film 3 is stacked on a non-magnetic substrate made of a non-magnetic material.

The non-magnetic substrate 2 is made of the non-magnetic material such as quartz glass, aluminum or silicon (Si). In the embodiment of the present invention, glass is applied as a material of the non-magnetic substrate 2. Hence, the non-magnetic substrate 2 is called hereinafter a glass substrate 2. The glass substrate 2 is configured to secure the strength of the entirety of the magnetic recording medium 1.

The recording layer 3 has a structure where a base layer 4, a primary layer 5, a main magnetic film 6, and a protection film 7 are stacked from the glass substrate 2 side. The base layer 4 is, for example, a thin film made of ruthenium (Ru) with thickness of, for example, approximately 20 nm. The base layer 4 is configured to improve crystallinity of the main magnetic film 6 formed on the base layer 4. The base layer 4 is formed of a single layer or plural layers. Material of the base stacked layer of an amorphous Ta layer, a NiFeCr layer, and a Ru layer or NiFeCr layer may be used as the base layer 4.

The main magnetic film 6 may be made of a strong magnetic material whose main ingredients are Co and Pt, a strong magnetic material whose main ingredients are Co and Pd, or a strong magnetic material whose main ingredients are Fe and Pt. More specifically, a magnetic alloy of CoPt such as CoPt or CoCRPt, a magnetic film having an artificial lattice structure where the Co film and the Pd film are stacked, or a magnetic film having an artificial lattice structure where the Fe film and the Pt film are stacked can be used as the main magnetic film 6. The main magnetic film 6 has a thickness of, for example, 20 nm.

Figure 3A:
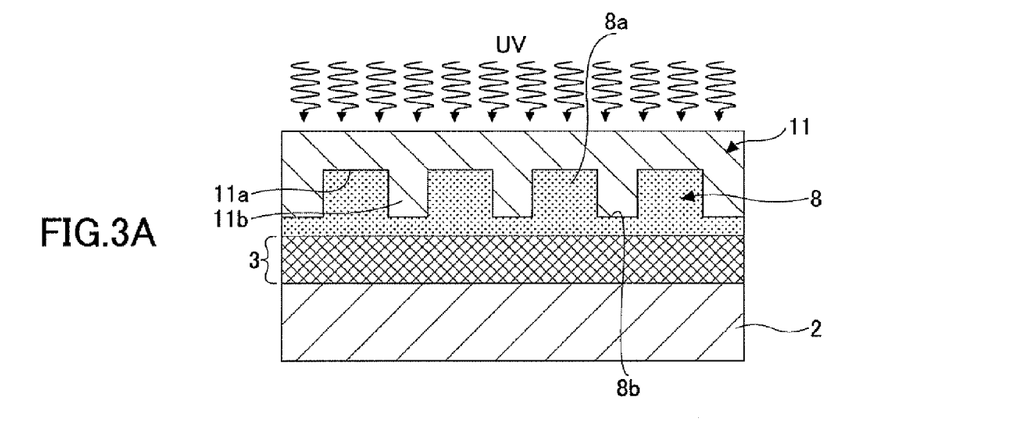
FIG. 3A through FIG. 3C are second views for explaining the manufacturing method of the magnetic recording medium of an embodiment of the present invention.
Figure 3B:
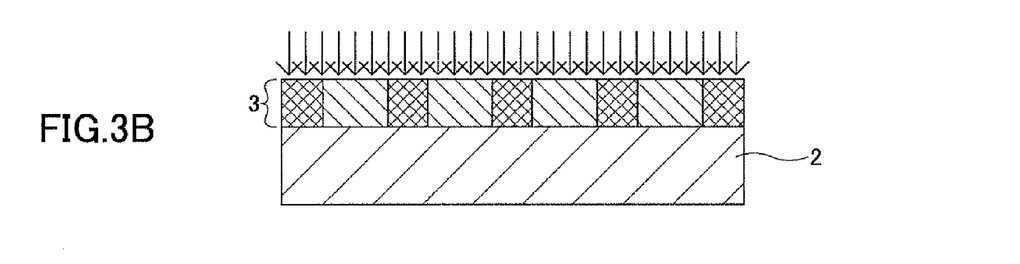
Figure 3C:
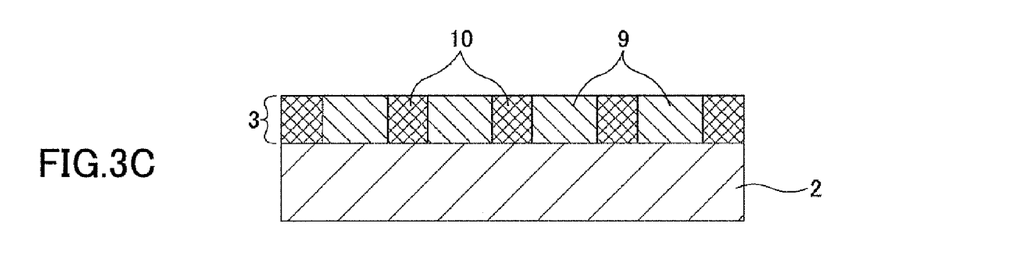

By performing ion doping (ion implantation) as discussed below, recording areas 9 and guard areas 10 are formed in the main magnetic film 6. The recording areas 9 and guard areas 10 are schematically shown in FIG. 3C. A magnetic state of areas of the main magnetic film 6 where ion doping is performed is locally changed so that the saturation magnetization is reduced. On the other hand, high saturation magnetization is maintained in the areas of the magnetic film 6 where ion doping is not performed.

Therefore, the guard areas 10, where the ion doping is performed, guards against (prevents) leakage of the magnetic field from the recording area 9. Thus, neighboring recording areas 9 are magnetically separated by the guard areas 10 so that magnetic recording can be performed with high densities.

The protection film 7 is configured to protect the main magnetic film 6. For example, Diamond Like Carbon (DLC) can be used as a material of the protection film 7. The protection film 7 has a thickness of, for example, 3 nm.

The primary layer 5 is provided between the base layer 4 and the main magnetic film 6. In other words, the primary layer 5 is formed at the glass substrate 2 side of the main magnetic film 6. A material whose main ingredient is at least one kind of atom selected from a group consisting of Cr, B, Mo, Al, Si, and C is used as the material of the primary layer 5.

By forming the primary layer 5 made of the above-mentioned material at the glass substrate 2 side of the main magnetic film 6, it is possible to securely reduce saturated vapor of the guard areas 10 where ion doping is performed and therefore it is possible to perform magnetic recording well on the recording areas 9.

Next, a manufacturing method of the magnetic recording medium 1 of the embodiment of the present invention is discussed with reference to FIG. 2A through FIG. 2E and FIG. 3A through FIG. 3C. FIG. 2A through FIG. 2E and FIG. 3A through FIG. 3C are first and second views for explaining the manufacturing method of the magnetic recording medium 1. In FIG. 2A through FIG. 2E and FIG. 3A through FIG. 3C, parts that are the same as the parts shown in FIG. 1 are given the same reference numerals, and explanation thereof is omitted.

Figure 2A:
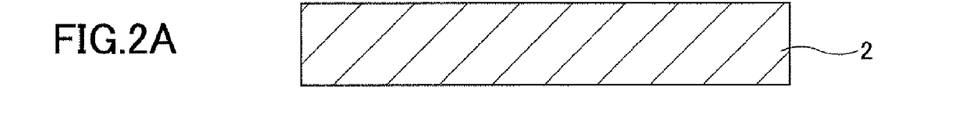
FIG. 2A through FIG. 2E are first views for explaining a manufacturing method of the magnetic recording medium of an embodiment of the present invention.

In order to manufacture the magnetic recording medium 1 of the embodiment of the present invention, first, as shown in FIG. 2A, the glass substrate 2 is prepared as a non-magnetic substrate configured to support the recording film 3. Although the glass substrate 2 is used as the substrate in this embodiment, the material for the substrate is not limited to glass. Other non-magnetic material such as aluminum or silicon can be used as the material for the substrate.

Figure 2B:
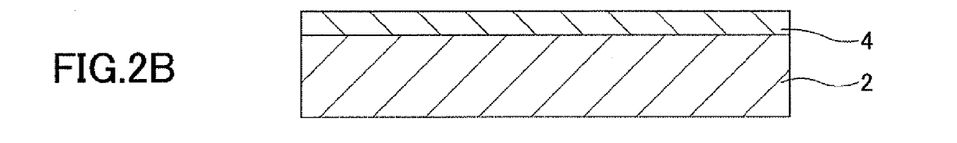

The base layer 4 is formed on an upper surface of the glass substrate 2. A Ru layer having thickness of approximately 20 nm as the base layer 4 is deposited on the glass substrate 2 at an Ar gas pressure of approximately 4.0 Pa and sputtering electric power of approximately 4 kW. FIG. 2B shows a state where the base layer 4 is formed on the glass substrate 2.

Figure 2C:
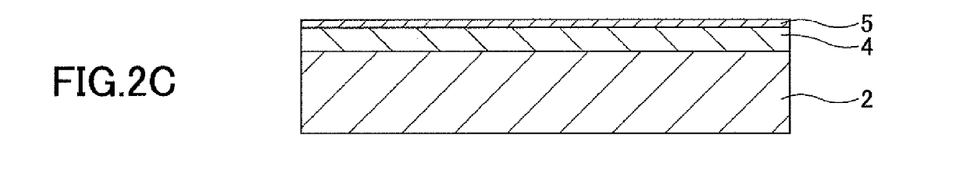

Next, the primary layer 5 is formed on the upper part of the base layer 4. The primary layer 5 having thickness of approximately 5 nm is formed on the base layer 4 at an Ar gas pressure of approximately 4.0 Pa and sputtering electric power of approximately 4 kW by using the material whose main ingredient is at least one kind of atom selected from a group consisting of Cr, B, Mo, Al, Si, and C as a target. FIG. 2C shows a state where the primary layer 5 is formed on the base layer 4.

Figure 2D:
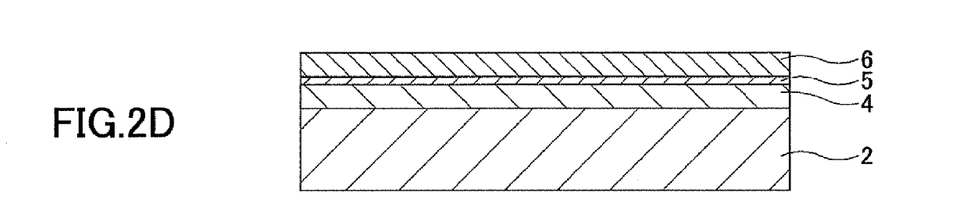

After the primary layer 5 is formed, the main magnetic film 6 is formed on the primary layer 5. In this embodiment, since CoPt is used as the main magnetic film 6, the main magnetic film 6 having thickness of approximately 20 nm is deposited on the primary layer 5 at an Ar gas pressure of approximately 0.5 Pa and sputtering electric power of approximately 0.1 kW by using CoPt as a target. FIG. 2D shows a state where the main magnetic film 6 is formed on the primary layer 5.

In a case where CoCrPt is used as the main magnetic film 6, sputtering is performed by using CoCrPt as a target. In addition, in a case where a strong magnetic film having an artificial lattice structure where the Co film and the Pd film are stacked is formed, first, a Co film is formed by using Co as a target. Then, a Pd film is formed on the Co film by using Pd as a target. By repeating the above-mentioned forming of the Co layer and the Pd layer at designated times, an artificial lattice structure of the Co films and the Pd films is formed.

In a case where a strong magnetic film having an artificial lattice structure where a Fe film and a Pt film are stacked is formed, first, a Fe film is formed by using Fe as a target. Then, a Pt film is formed on the Fe film by using Pt as a target. By repeating the above-mentioned forming of the Fe layer and the Pt layer at designated times, an artificial lattice structure of the Fe films and the Pt films is formed. Sputtering conditions for forming this artificial lattice structure, for example, may be Ar gas pressure of approximately 0.5 Pa and sputtering electric power of approximately 0.1 kW.

Figure 2E:
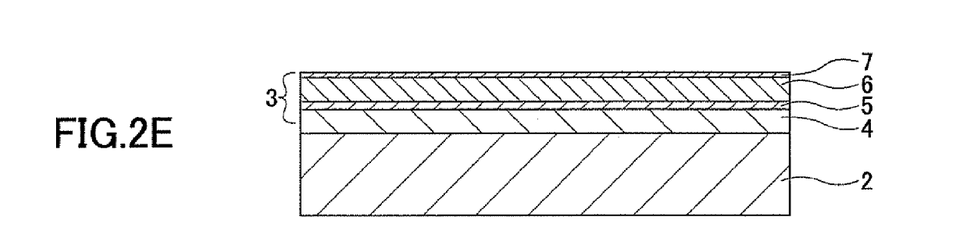

Last, a DLC layer, as the protection film 7, having thickness of approximately 3 nm is formed on the upper part of the main magnetic film 6. It is preferable to apply a liquid lubricant layer on the protection film 7. FIG. 2E shows a state where the protection film 7 is formed. By performing the steps shown in FIG. 2A through FIG. 2E, the recording film 3 including the base layer 4, the primary layer 5, the main magnetic film 6, and the protection film 7 is formed on the glass substrate 2.

After the recording film 3 is formed on the glass substrate 2, ultraviolet (UV) curing resin 8 is provided on the recording film 3. Then, the UV curing resin 8 is molded by using a nanoimprint mold 11. The nanoimprint mold 11 has a concave and convex shaped configuration corresponding to the recording areas 9 and the guard areas 10. More specifically, concave parts 11a are formed in positions corresponding to the recording areas 9 and convex parts 11b are formed in positions corresponding to the guard areas 10.

By pressing the nanoimprint mold 11 having the concave parts 11a and the convex parts 11b to the UC curing resin 8, convex parts 8a and concave parts 8b corresponding to the concave parts 11a and the convex parts 11b of the nanoimprint mold 11 are formed in the UV curing resin 8. Accordingly, the convex parts 8a are formed in positions corresponding to the recording areas 9 and the concave parts 8b are formed in positions corresponding to the guard areas 10.

After this pressing process, UV irradiation is performed so that the UV curing resin 8 is cured. FIG. 3A shows a state where the UV curing resin 8 is molded by the nanoimprint mold 11 and UV irradiation is being performed.

After the curing process of the UV curing resin 8 is completed, the nanoimprint mold 11 is removed. Then, an ion doping process is performed on the recording film 3 (more specifically, the main magnetic film 6) by using the UV curing resin 8 as a mask. This ion doping process is performed by using a known ion implantation apparatus.

By controlling applying energies, ion doping between the primary layer 5 and the main magnetic layer 6 can be performed. As long as the saturation magnetization of the main magnetic film 6 can be reduced, there is no limitation of the ions which are doped (implanted). In this embodiment, Ar ions are used as the ions which are doped (implanted). The ion doping conditions are the implantation energy of 25 KeV and the dose amount of $5\times10^{15}$ atoms/cm$^2$. FIG. 3B shows a state where the ion doping is being performed on the recording film 3. In FIG. 3B, illustration of the UV curing resin 8 is omitted.

The ion doping process on the recording film 3 is performed via the UV curing resin 8 where the convex parts 8a and the concave parts 8b are formed. Accordingly, the ions going out from the ion implantation apparatus are diffused in parts where the convex parts 8a, having greater thickness than the concave parts 8b, are formed so that the amount of ion implantation to go into the recording film 3 is reduced. On the other hand, the ions going out from the ion implantation apparatus enter the recording film 3 via the concave parts 8b having less thickness than that of the convex parts 8a.

As a result of this, the recording areas 9 of the main magnetic film 6 of the recording film 3 are formed in positions facing to the convex parts 8a. In the recording areas 9, the saturation magnetization is not reduced by the ion doping process. On the other hand, the ions enter the positions of the main magnetic film 6 facing the concave parts 8b so that the saturation magnetization is reduced compared to the recording areas 9 so that the guard areas 10 are formed. FIG. 3C shows a state where the recording areas 9 and the guard areas 10 are formed on the main magnetic film 6. Although it is illustrated in FIG. 3C, for the convenience of illustration, the recording areas 9 and the guard areas 10 are provided in the entirety in the thickness direction of the recording film 3, the recording areas 9 and the guard areas 10 are actually formed in only the main magnetic film 6.

By repeating the above-discussed steps, the magnetic recording medium 1 is manufactured. The manufacturing process of the magnetic recording medium 1 is substantially the same as the process performed in the conventional art except forming the primary layer 5. In addition, the primary layer 5 can be formed by a series of steps (under the same vacuum environment) with other films (the base layer 4, the main magnetic film 6, and the protection film 7) forming the recording film 3. Because of this, it is possible to easily manufacture the magnetic recording medium 1 having the primary layer 5. Hence, it is possible to prevent complex manufacturing steps and increases of the manufacturing costs.

Next, properties of the magnetic recording medium 1 manufactured by the above-discussed method are discussed with reference to FIG. 4 through FIG. 7.

Figure 4:
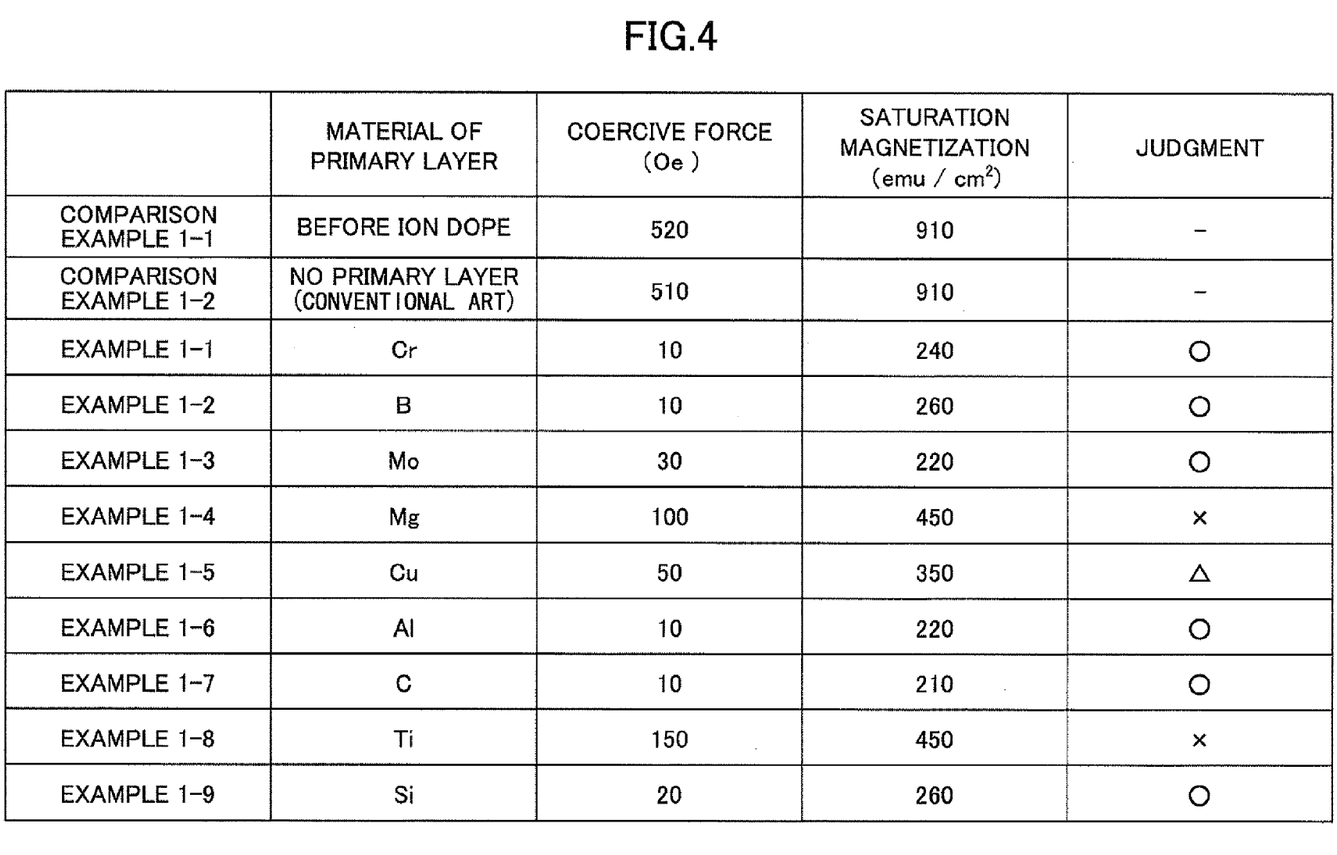
FIG. 4 is a table showing magnetic properties of a magnetic recording medium of an embodiment of the present invention where CoPt is used as the magnetic film and comparison examples.

FIG. 4 is a table showing actual experimental measuring results of coercive forces and saturation magnetizations, in a case where CoPt is used as the material of the main magnetic film 6 and in a case where Ar ions are doped in the main magnetic film 6 of each of the magnetic recording media where the material of the primary layer 5 is Cr, B, Mo, Mg, Cu, Al, C, Ti, or Si. The ion doping conditions are the implantation energy of 25 KeV and the dose amount of $5\times10^{15}$ atoms/cm$^2$.

Figure 5:
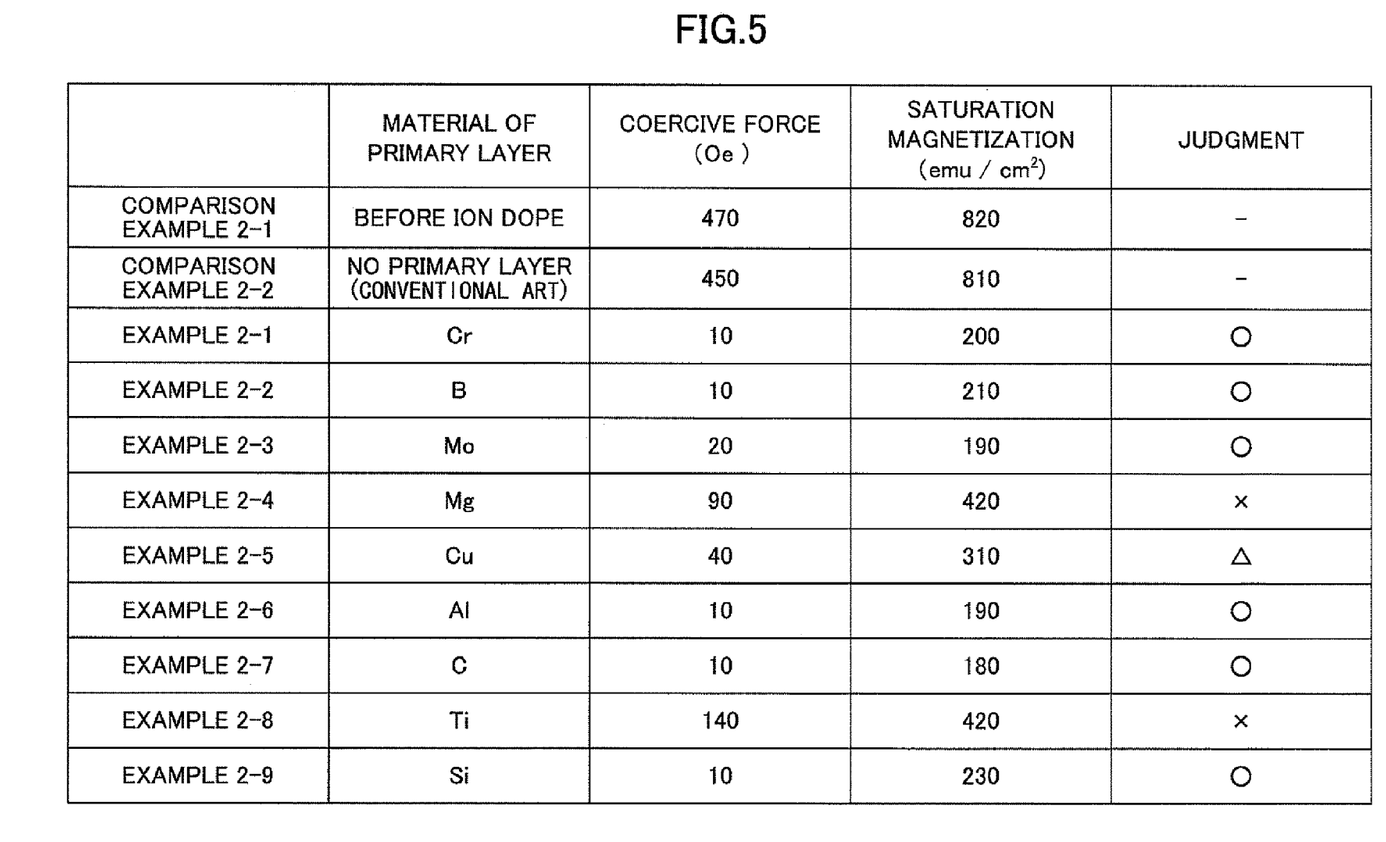
FIG. 5 is a table showing magnetic properties of a magnetic recording medium of an embodiment of the present invention where CoCrPt is used as the magnetic film and comparison examples.
Figure 6:
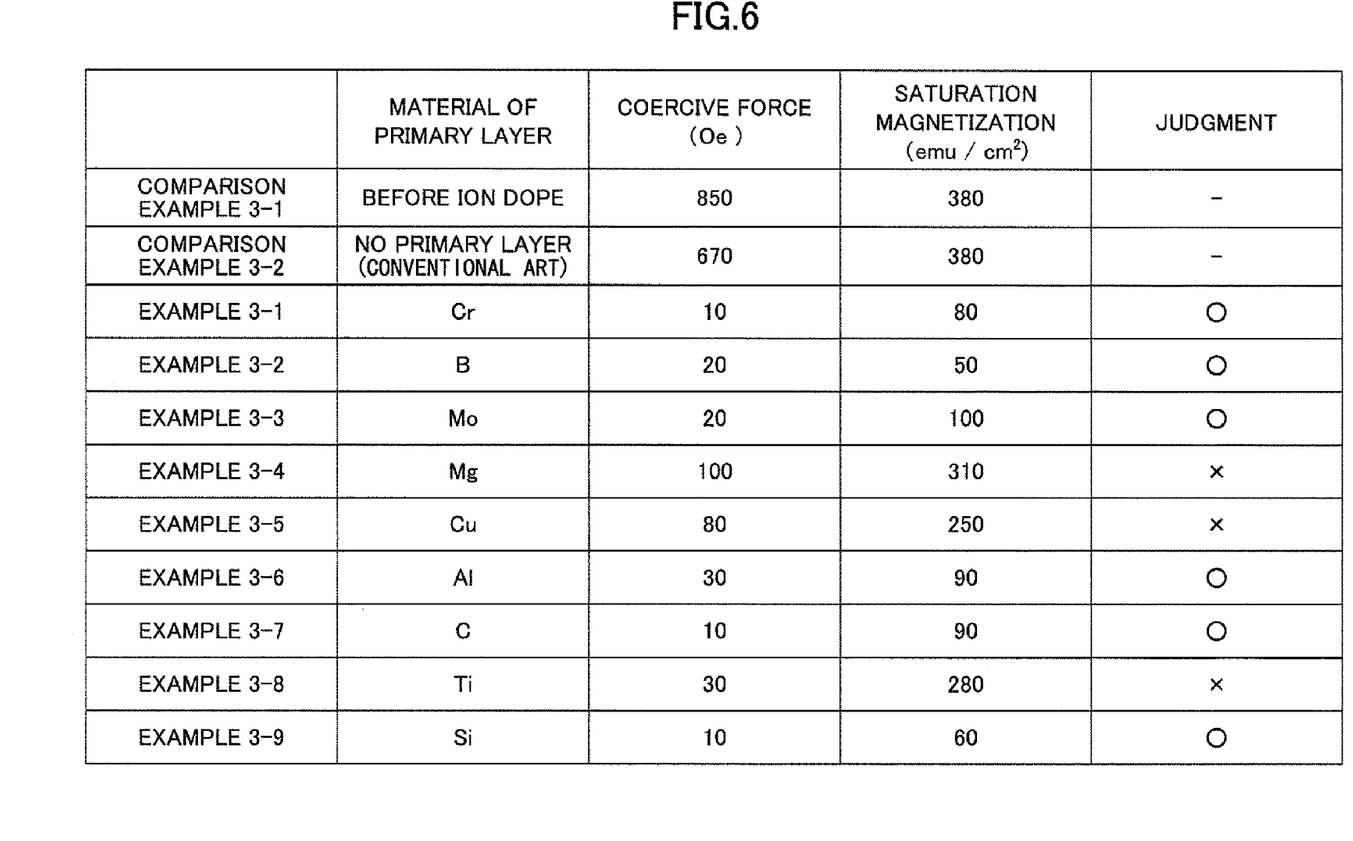
FIG. 6 is a table showing magnetic properties of a magnetic recording medium of an embodiment of the present invention where a Co thin film and a Pt thin film are stacked as the magnetic film and comparison examples.
Figure 7:
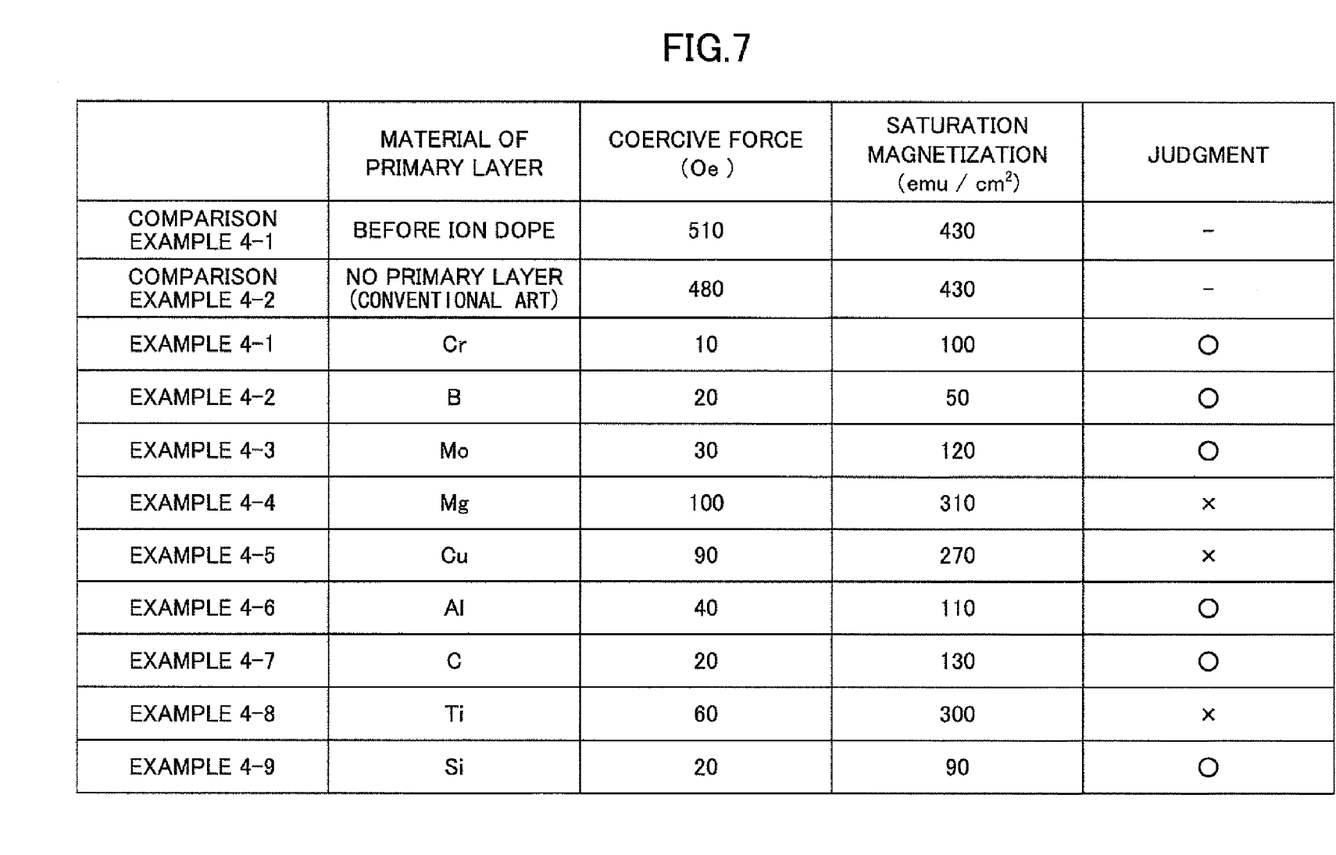
FIG. 7 is a table showing magnetic properties of a magnetic recording medium of an embodiment of the present invention where a Fe thin film and a Pt thin film are stacked as the magnetic film and comparison examples.

Similarly, FIG. 5 is a table showing measuring results of coercive forces and saturation magnetizations, in a case where CoCrPt is used as the material of the main magnetic film 6 and in a case where ions are doped in the main magnetic film 6 of each of the magnetic recording media where the material of the primary layer 5 is Cr, B, Mo, Mg, Cu, Al, C, Ti, or Si. FIG. 6 is a table showing measuring results of coercive forces and saturation magnetizations, in a case where the artificial lattice structure formed by stacking the Co film and the Pd film is used as the material of the main magnetic film 6 and in a case where ions are doped in the main magnetic film 6 of each of the magnetic recording media where the material of the primary layer 5 is Cr, B, Mo, Mg, Cu, Al, C, Ti, or Si. FIG. 7 is a table showing measuring results of coercive forces and saturation magnetizations, in a case where the artificial lattice structure formed by stacking the Fe film and the Pt film is used as the material of the main magnetic film 6 and in a case where ions are doped in the main magnetic film 6 of each of the magnetic recording media where the material of the primary layer 5 is Cr, B, Mo, Mg, Cu, Al, C, Ti, or Si. The ion doping conditions of the cases shown in FIG. 5 through FIG. 7 are the same as the case shown in FIG. 4.

In each of FIG. 4 through FIG. 7, comparison examples ("before ion dope") 1-1, 2-1, 3-1, and 4-1 show measuring results of coercive forces and saturation magnetizations of the magnetic recording medium 1 before the ion doping process is performed on the main magnetic film 6. Furthermore, in each of FIG. 4 through FIG. 7, comparison examples ("no primary layer (conventional art)") 1-2, 2-2, 3-2, and 4-2 show measuring results of coercive forces and saturation magnetizations in a case where, like a magnetic recording medium 100 shown in FIG. 9, a recording film where a base layer 104, a main magnetic film 106, and a protection film 107 are stacked is formed on the upper part of a glass substrate 102 and ion doping is performed on only the main magnetic film 106.

Figure 9:
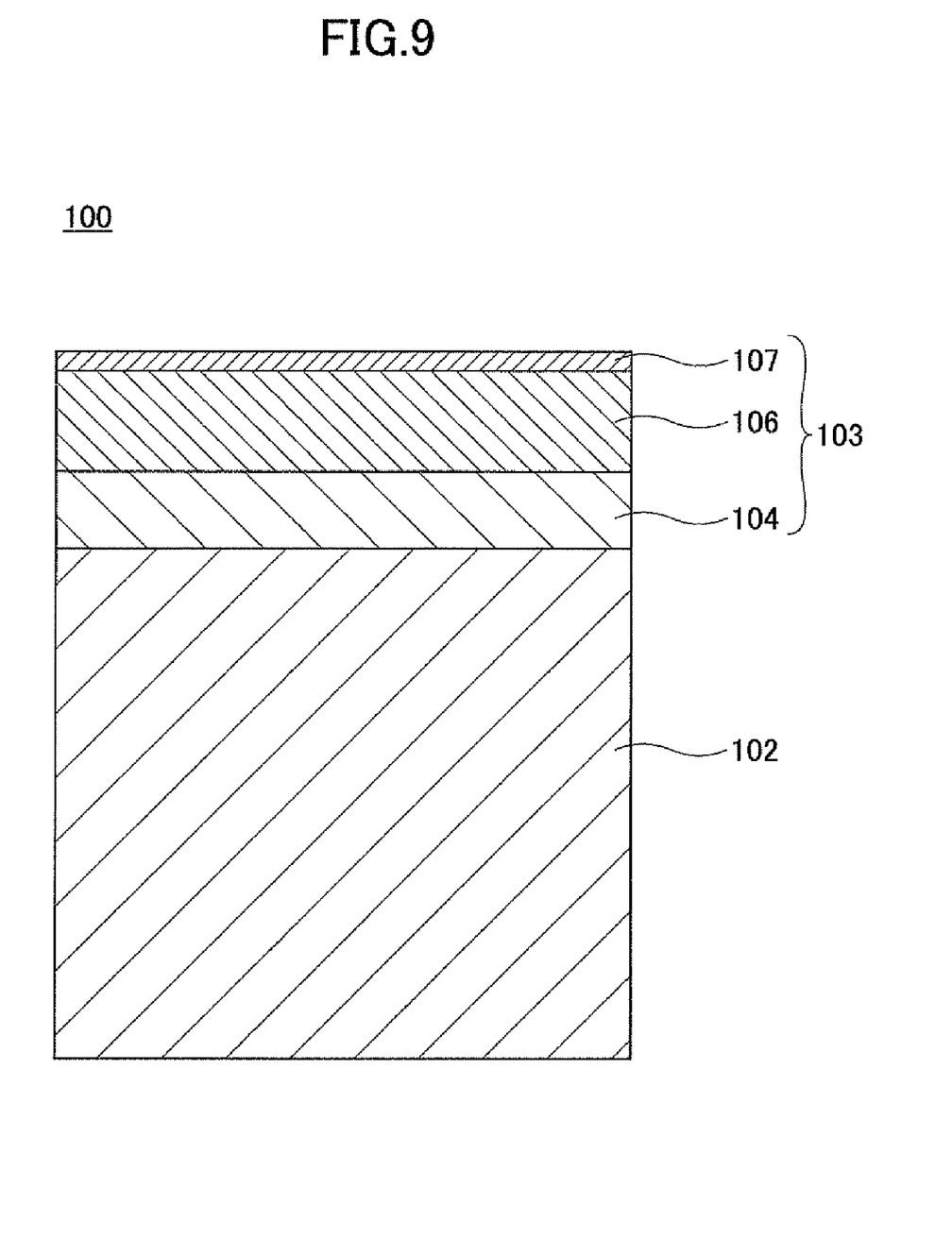
FIG. 9 is a cross-sectional view of a magnetic recording medium of a comparison example.

The magnetic recording medium 100 has the same structure of the films 104, 106, and 107 as the base layer 4, the main magnetic film 6, and the protection film 7 of the magnetic recording medium 1 except that the magnetic recording medium 100 does not have the primary layer 5.

First, properties of the magnetic recording medium 1 using CoPt as a material of the main magnetic film 6 of FIG. 4 are discussed. According to FIG. 4, it is found that saturation magnetizations of the examples 1-1 through 1-9 where the ion doping is performed are reduced comparing to saturation magnetizations of the comparison example 1-1 before the ion doping is performed and the comparison example 1-2 where the ion doping is not performed.

The reduction of the saturation magnetization is generated in other magnetic recording media shown in FIG. 5 through FIG. 7. In other words, in the case where CoCrPt is used as the material of the main magnetic film 6 as shown in FIG. 5, saturation magnetizations of the examples 2-1 through 2-9 are reduced compared to saturation magnetizations of the comparison example 1-1 and the comparison example 1-2. Furthermore, in the case where the artificial lattice structure formed by mutually stacking the Co films and the Pd films is used as the material of the main magnetic film 6 as shown in FIG. 6, saturation magnetizations of the examples 3-1 through 3-9 are reduced compared to saturation magnetizations of the comparison example 3-1 and the comparison example 3-2. Furthermore, in the case where the artificial lattice structure formed by mutually stacking the Fe films and the Pt films is used as the material of the main magnetic film 6 as shown in FIG. 7, saturation magnetizations of the examples 4-4 through 4-9 are reduced compared to saturation magnetizations of the comparison example 4-1 and the comparison example 4-2.

Thus, saturation magnetization in the doped position is reduced by forming the primary layer 5 made of Cr, B, Mo, Mg, Cu, Al, C, Ti, Si, or the like at the glass substrate 2 side of the main magnetic film 6 and performing the ion doping between the primary layer 5 and the main magnetic film 6. This is because the atoms of the primary layer 5 are diffused into the main magnetic film 6 by ion doping. When the atoms of the primary layer 5 are diffused into the main magnetic film 6, the atoms of the main magnetic film 6 (CoPr in the example shown in FIG. 4) and the atom of the primary layer 5 (Cr, B, Mo, Mg, Cu, Al, C, Ti, or Si) are mixed so that non-magnetization is generated. Because of this, in order to securely reduce the saturation magnetization of the guard area 10, it is necessary to directly form the main magnetic film 6 on the primary layer 5.

Next, materials of the primary layer 5 which can effectively realize the non-magnetization of the main magnetic film 6 are discussed with reference to FIG. 4 through FIG. 7. In order to prevent generation of interference between the neighboring recording areas 8 when the magnetic recording medium 1 is used as a vertical magnetic recording medium, in a case where the main magnetic film 6 is made of CoPt or CoCrPt as shown in FIG. 4 or FIG. 5, it is preferable that the saturation magnetization of the guard area 10 be less than 370 emu/cm$^2$. In a case where the main magnetic film 6 is made of the artificial lattice structure made of the Co film and the Pd film or the artificial lattice structure made of the Fe film and the Pt film as shown in FIG. 6 or FIG. 7, it is preferable that the saturation magnetization of the guard area 10 be less than 250 emu/cm$^2$.

From this point, ○ which means "good", Δ which means "a little bad", and X which means "bad" are indicated in FIG. 4 through FIG. 7. According to the judgment, it is found that it is preferable to use at least one kind of atom selected from a group consisting of Cr, B, Mo, Al, Si, and C as a material of the primary layer 5.

Accordingly, the primary layer 5 is made of a material whose main ingredient is at least one kind of atom selected from a group consisting of Cr, B, Mo, Al, Si, and C. The main magnetic film 6 is formed on the primary layer 5. The main magnetic film 6 is made of CoPt, CoCrPt, the Co/Pd artificial lattice structure, or the Fe/Pt artificial lattice structure; the ion doping is performed on the primary layer 5. As a result of this, the saturation magnetization of the guard area 10 is reduced and thereby it is possible to perform good magnetic recording on the recording areas 9 without cross-talk.

Figure 8:
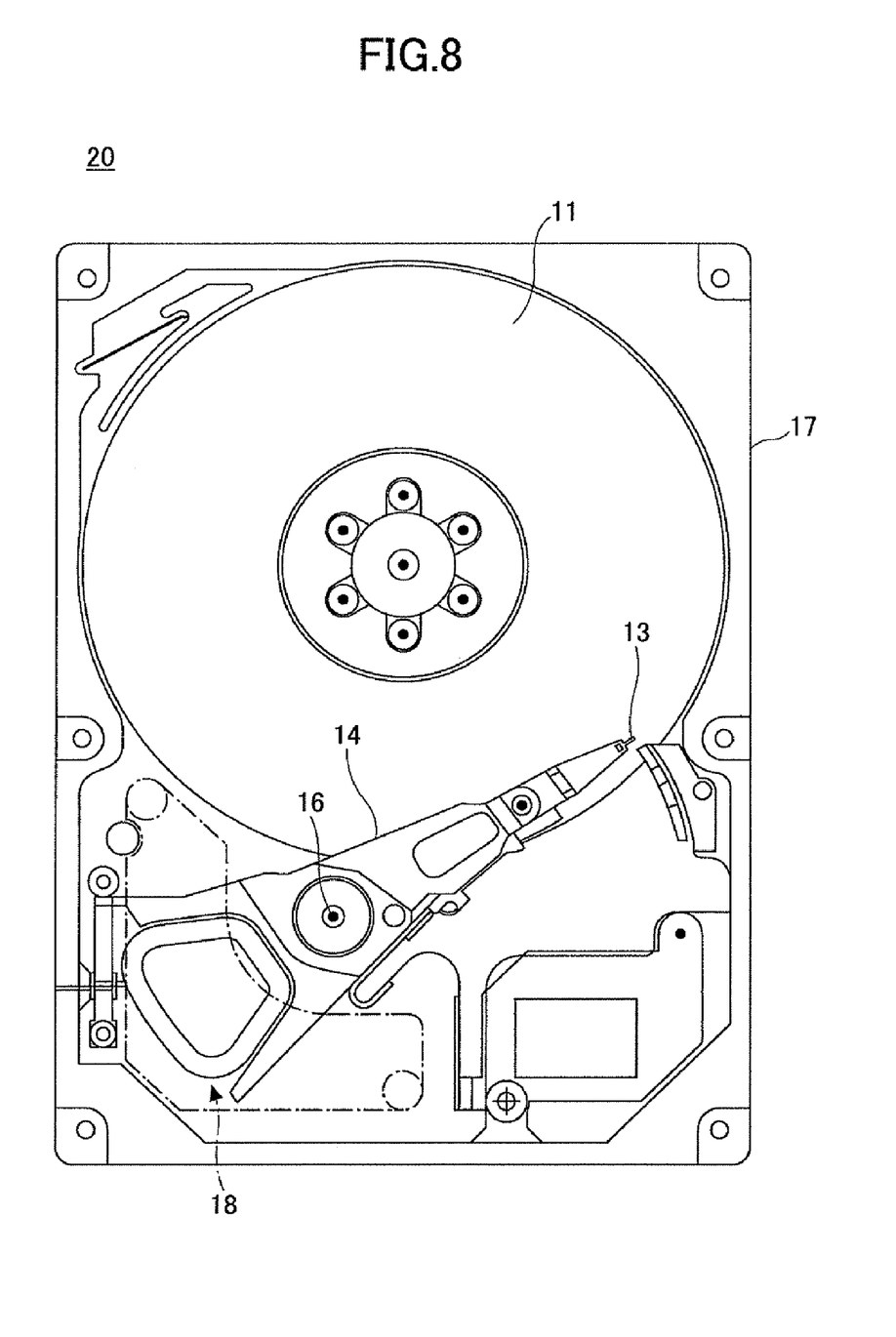
FIG. 8 is a plan view of a magnetic recording and reproducing apparatus of the embodiment of the present invention.

Next, a magnetic recording and reproducing apparatus 20 where the magnetic recording media 10A through 10C of the embodiment of the present invention can be installed is discussed with reference to FIG. 8. FIG. 8 is a plan view of the magnetic recording and reproducing apparatus 20 of the embodiment of the present invention. The magnetic recording and reproducing apparatus 20 is a hard disk apparatus installed in a personal computer, as a recorder of a television set, or the like.

In the magnetic recording and reproducing apparatus 20, the magnetic recording medium 10 as a hard disk is mounted in a housing 17. The magnetic recording medium 10 can be rotated by a spindle motor or the like (not shown). In addition, a carriage arm 14 is provided inside the housing 17. The carriage arm 14 can be rotated with respect to a shaft 16 by a voice coil motor (VCM) 18. The magnetic head 13 is provided at a head end of the carriage arm 14. The magnetic head 13 scans above the magnetic recording medium 10 so that magnetic information is written in or read from the magnetic recording medium 10.

There is no limitation of the kind of the magnetic head 13. The magnetic head may be formed of a magnetic resistance element such as Giant Magneto-Resistive (GMR) element or a Tunneling Magneto-Resistive (TuMR) element. In addition, the magnetic recording and reproducing apparatus is not limited to the above-discussed hard disk apparatus. The magnetic recording and reproducing apparatus 20 may be an apparatus configured to record the magnetic information on a flexible tape magnetic recording medium.

Thus, in the embodiment of the present invention, the primary layer whose main ingredient is at least one kind of atom selected from a group consisting of Cr, B, Mo, Al, Si, and C is provided at the substrate side of the main magnetic film is provided in the magnetic recording medium. Therefore, it is possible to reduce the saturation magnetization of an area where ions are doped (implanted). Therefore, it is possible to perform the magnetic recording well on the recording area.

According to the above-discussed magnetic recording medium, it is possible to optionally set magnetic properties of a magnetic recording area by selection of ion species for ion implantation, control of an accelerating implantation energy at the time of the ion implantation, or the like. In addition, it is possible to individually set the magnetic properties of the magnetic recording area for every magnetic recording area so that various magnetic recording media can be realized.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2008-118926 filed on Apr. 30, 2008, the entire contents of which are hereby incorporated herein by reference.

What is claimed is:

1. A magnetic recording medium, comprising:
   a substrate;
   a recording film formed on the substrate and including a main magnetic film; and
   a primary layer formed in direct contact with a substrate side surface of the main magnetic film,
   wherein the main magnetic film includes locally ion-doped recording areas separated from one another by locally ion-doped guard areas, the guard areas having a positive saturation magnetization value less than 370 emu/cm$^2$ and less than a saturation magnetization value of the recording areas, and
   wherein the primary layer is made of a material consisting of one kind of atom selected from a group consisting of B, Mo, Al, Si, and C.

2. The magnetic recording medium as claimed in claim 1, wherein the main magnetic film is made of CoPt.

3. The magnetic recording medium as claimed in claim 1, wherein the main magnetic film is made of CoCrPt.

4. The magnetic recording medium as claimed in claim 1, wherein the main magnetic film is made of an artificial lattice structure of a Co film and a Pd film.

5. The magnetic recording medium as claimed in claim 1, wherein the main magnetic film is made of an artificial lattice structure of a Fe film and a Pt film.

6. The magnetic recording medium as claimed in claim 1, wherein the recording film has a structure where a base layer, the primary layer, the main magnetic film, and a protection film are stacked from the substrate side.

7. A manufacturing method of a magnetic recording medium, comprising:
   forming a primary layer of a material consisting of one kind of atom selected from a group consisting of B, Mo, Al, Si, and C;
   forming a main magnetic film on the primary layer after the primary layer is formed; and
   forming recording areas and guard areas in the main magnetic film by local ion doping,
   wherein the main magnetic film includes the locally ion-doped recording areas separated from one another by the locally ion-doped guard areas, the guard areas having a positive saturation magnetization value less than 370 emu/cm$^2$ and less than a saturation magnetization value of the recording areas.

8. The manufacturing method of the magnetic recording medium as claimed in claim 7, wherein the main magnetic film is made of CoPt.

9. The manufacturing method of the magnetic recording medium as claimed in claim 7, wherein the main magnetic film is made of CoCrPt.

10. The manufacturing method of the magnetic recording medium as claimed in claim 7, wherein the main magnetic film is made of an artificial lattice structure of a Co film and a Pd film.

11. The manufacturing method of the magnetic recording medium as claimed in claim 7, wherein the main magnetic film is made of an artificial lattice structure of a Fe film and a Pt film.

12. The manufacturing method of the magnetic recording medium as claimed in claim 7, wherein forming the main magnetic film includes:
   forming a base layer on the substrate;
   forming the primary layer on the base layer;
   forming the main magnetic film on the primary layer; and
   forming the protection film on the main magnetic film.

13. A magnetic recording and reproducing apparatus, comprising:
   a magnetic recording medium;
   a magnetic head configured to perform a magnetic recording and reproducing process on the magnetic recording medium;
   an arm configured to support the magnetic head; and
   a moving part configured to move the arm,
   wherein the magnetic recording medium comprises:
   a substrate;
   a recording film formed on the substrate and including a main magnetic film; and
   a primary layer formed in direct contact with a substrate side surface of the main magnetic film,
   wherein the main magnetic film includes locally ion-doped recording areas separated from one another by locally ion-doped guard areas, the guard areas having a positive saturation magnetization value less than 370 emu/cm$^2$ and less than a saturation magnetization value of the recording areas, and
   wherein the primary layer is made of a material consisting of one kind of atom selected from a group consisting of B, Mo, Al, Si, and C.

* * * * *